United States Patent
Minamizawa

[19]

[11] Patent Number: 5,917,894
[45] Date of Patent: Jun. 29, 1999

[54] COMMUNICATION APPARATUS, METHOD AND STORAGE MEDIUM FOR SELECTING COMMUNICATION PATH BY EVALUATING INPUT INFORMATION

[75] Inventor: Fumihiro Minamizawa, Toyoake, Japan

[73] Assignee: Brother Kogyo Kabushiki Kaisha, Nagoya, Japan

[21] Appl. No.: 08/890,901

[22] Filed: Jul. 10, 1997

[30] Foreign Application Priority Data

Jul. 22, 1996 [JP] Japan .................................. 8-191930

[51] Int. Cl.[6] .............................................. H04M 11/00
[52] U.S. Cl. ............................... 379/93.07; 379/100.12
[58] Field of Search ................... 379/93.01, 93.05–93.09, 379/93.11, 93.14, 93.15, 93.32, 100.01, 100.06, 100.09, 100.12, 100.13–100.17, 354–357; 358/400, 404, 442–444, 468

[56] References Cited

U.S. PATENT DOCUMENTS

| | | | |
|---|---|---|---|
| 4,998,248 | 3/1991 | Matsuzaki | 379/93.11 |
| 5,204,895 | 4/1993 | Yoshiura | 379/100.12 |
| 5,276,687 | 1/1994 | Miyamoto | 379/93.11 |
| 5,323,398 | 6/1994 | Wake et al. | 379/100.17 |
| 5,396,341 | 3/1995 | Takahashi et al. | 358/400 |
| 5,418,625 | 5/1995 | Shimoosawa | 379/100.12 |
| 5,521,719 | 5/1996 | Yamada | 379/100.12 |

*Primary Examiner*—Wing F. Chan
*Attorney, Agent, or Firm*—Oliff & Berridge, PLC

[57] ABSTRACT

When it is determined whether transmission-destined information corresponding to a number inputted from a control unit of a facsimile apparatus exists in an EEPROM and the corresponding information destined for transmission is found to exist therein, the transmission-destined information is read. When the transmission-destined information consists of figures alone, a transmit destination is judged to be a telephone line and hence data is transmitted to the telephone line through a modem and an NCU. When the transmission-destined information is other than the figures, the transmit destination is determined to be a LAN and hence data is transmitted to the LAN through a LAN adapter.

20 Claims, 2 Drawing Sheets

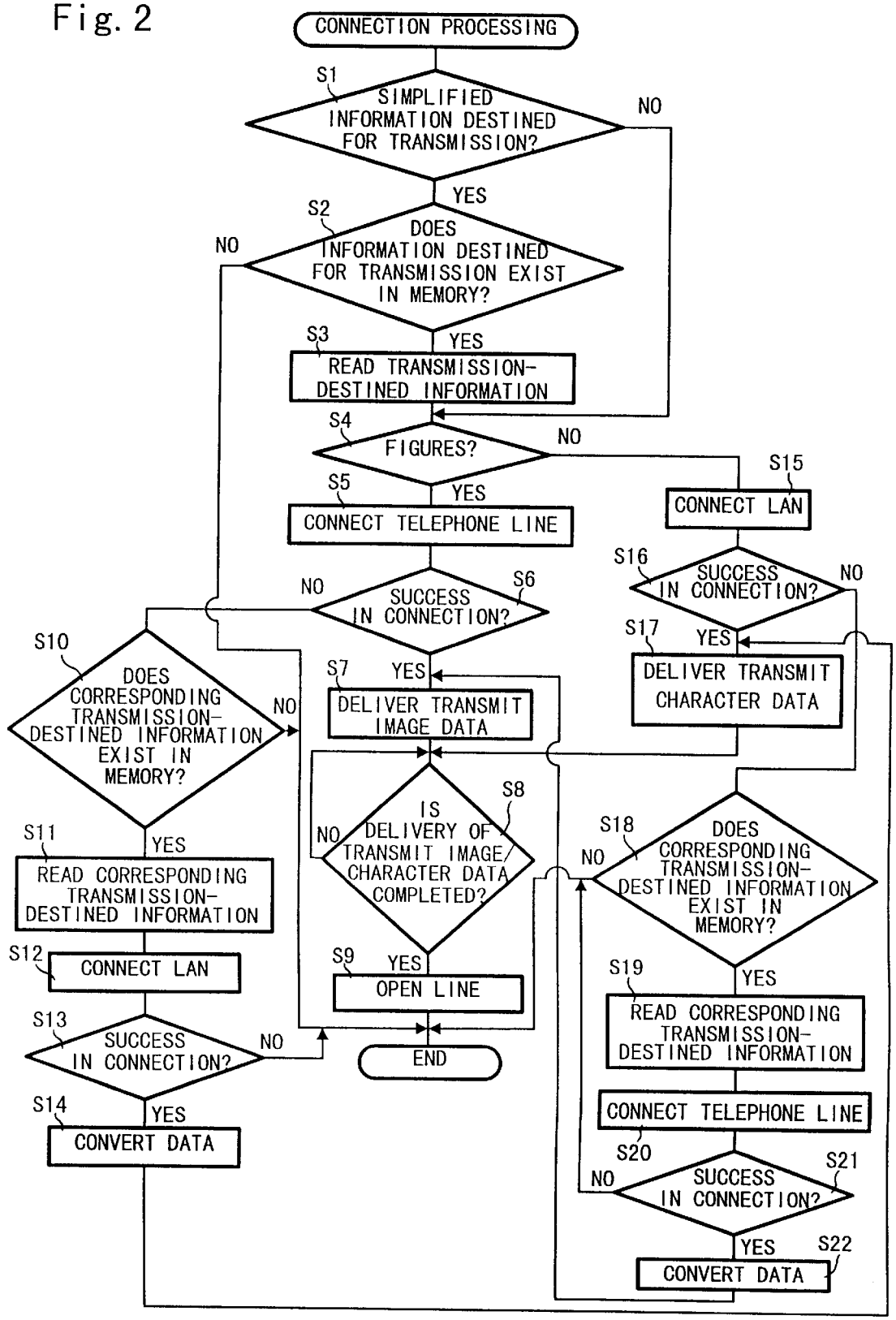

COMMUNICATION APPARATUS, METHOD AND STORAGE MEDIUM FOR SELECTING COMMUNICATION PATH BY EVALUATING INPUT INFORMATION

BACKGROUND OF THE INVENTION

1. Field of Invention

The invention relates to a communication apparatus connected to a plurality of communications networks or lines different from one another in the type of information destined for transmission, and a storage medium storing programs therein for activating the communication apparatus.

2. Description of Related Art

A personal computer having a modem for personal computer communications, which is electrically connected to a LAN and a modem for facsimile communications, which is electrically connected to a telephone line, has needed to select either the LAN or the telephone line by using a keyboard or a mouse or the like for each transmission.

However, the conventional personal computer has a problem in that since it needs to set the personal computer communications or the facsimile communications for each transmission, its setting operation becomes cumbersome and expensive in the large amount of time and labor spent.

SUMMARY OF THE INVENTION

In view of the foregoing, an object of the invention is to provide a communication apparatus capable of eliminating the need for the operation of setting the type of communication upon transmission and a storage medium storing programs therein for activating the communication apparatus.

A communication apparatus in accordance with one aspect of the invention is connected to a plurality of communications networks different from one another in the type of information received. The communication apparatus includes an input device capable of inputting the information destined for transmission therein, a transmission-destined information classification determining device for determining whether the type of information destined for transmission inputted to the input device corresponds to any of the plurality of communication networks, and a transmit information output device for selectively outputting information to be transmitted. The information can be transmitted to any one of the plurality of communications networks according to the result of determination by the transmission-destined information classification determining device.

Since the determination is made as to whether the type of input transmission-destined information corresponds to any of the plurality of communications networks and the information to be transmitted is electively outputted to any of the plurality of communications networks according to the result of determination, the operation for setting the type of communication can be eliminated upon transmission.

When the information destined for transmission is a telephone number, for example, it consists of plural-digit figures. On the other hand, when the information is a mail address for the personal computer communications, it consists of a plurality of alphabetical characters or alphabetic codes or the like.

Further, the information destined for transmission may be directly input by a user, or may be read from a memory through a user's predetermined operation.

The plurality of communications networks or lines are, for example, telephone lines or LANs. Of course, the telephone line may be an ISDN and the LAN may be connected to an internet or the like.

As the communication apparatus, a personal computer is considered having, for example, a modem for facsimile communications, a facsimile apparatus connected to a personal computer or a facsimile apparatus having an OCR function, or the like. However, the communication apparatus is not necessarily limited to this.

The transmission-destined information classification determining device can be implemented by a CPU activated based on predetermined programs, for example.

The transmit information output device can be materialized by a CPU and a modem activated based on predetermined programs, for example.

According to another aspect of the invention, a communication apparatus is provided including a memory device for storing information destined for transmission therein so as to correspond to one-digit or a few-digit signs, and a transmission-destined information supplying device. Upon inputting the one-digit sign or a few-digit signs thereto from an input device, the transmission-destined information supplying device reads the information destined for transmission, corresponding thereto from the memory device and supplies it to a transmission-destined information classification determining device.

When a one-digit sign or a few-digit signs are inputted by a user's key operation or the like, its corresponding transmission-destined information is read from the memory or the like, so that the user can easily and rapidly input the information obtained by the communication apparatus as discussed above.

Any such figures, alphabetical characters, alphabetic signs, etc. may be used as inputtable signs.

As the memory device, an EEPROM, a RAM provided with battery backup, etc. may be used.

The transmission-destined information supplying device can be implemented by a CPU activated based on predetermined programs, for example.

According to a further aspect of the invention, there is provided a communication apparatus wherein communications networks include two types of first and second communications networks or lines, and a memory device for storing information destined for transmission therein. When information to be transmitted to the same transmit destination is different in type, the memory device stores the information therein such that the information corresponds to each other.

When one of the transmission-destined information stored in the memory device so as to correspond to each other is inputted from an input device, a transmit information output device selects one of the first and second communications networks and outputs information to be transmitted to the selected one according to the result of determination by a transmission-destined information classification determining device. When the information is intransmittable through the selected communications network, the transmit information output device reads the other transmission-destined information from the memory device and outputs the information to be transmitted to the other communications network.

According to the communication apparatus, since the information to be transmitted to the other communication network is outputted if the transmission of the information to be made through one communications network is in an impracticable state, the information can be reliably transmitted even when the state of the communications network is poor.

According to a still further aspect of the invention, a communication apparatus is provided including a data converting device for converting a data format of information to be transmitted into a data format fit to an actually-outputting communications network when the information to be transmitted is outputted to a second communications network because transmission to be made through a first communications network is placed in an impracticable state and when information to be transmitted is outputted to the first communications network because transmission to be made through the second communications network is placed in an impracticable state.

According to the communication apparatus, since the data format of the information to be transmitted is changed to the data format fit for the actually-outputting communications network, the information can be transmitted in data format fit to a receiving terminal without a hitch even when communications made through the first communications network differ in data format from communications made through the second communications network.

The data converting device can be implemented by a CPU activated based on predetermined programs, for example.

Further, a storage medium used in the communication apparatus of the invention is one having programs stored therein for activating the communication apparatus connected to a plurality of communications networks or lines different from one another in the type of information destined for transmission. The storage medium stores therein programs including a transmission-destined information classification determining program for making a decision as to whether the type of input information destined for transmission corresponds to any one of the plurality of communications networks, and a transmit information output program for selectively outputting information to be transmitted to any one of the plurality of communications networks according to the decision by the transmission-destined information classification determining program.

According to the storage medium, the operation of the communication apparatus can be implemented by activating the CPU based on the programs stored therein.

BRIEF DESCRIPTION OF THE DRAWINGS

A preferred embodiment of the invention will be described in detail with reference to the following figures wherein:

FIG. 2 is a flowchart for describing the procedure for performing connection processing by the facsimile apparatus shown in FIG. 1.

DETAILED DESCRIPTION OF PREFERRED EMBODIMENTS

Figure 1:
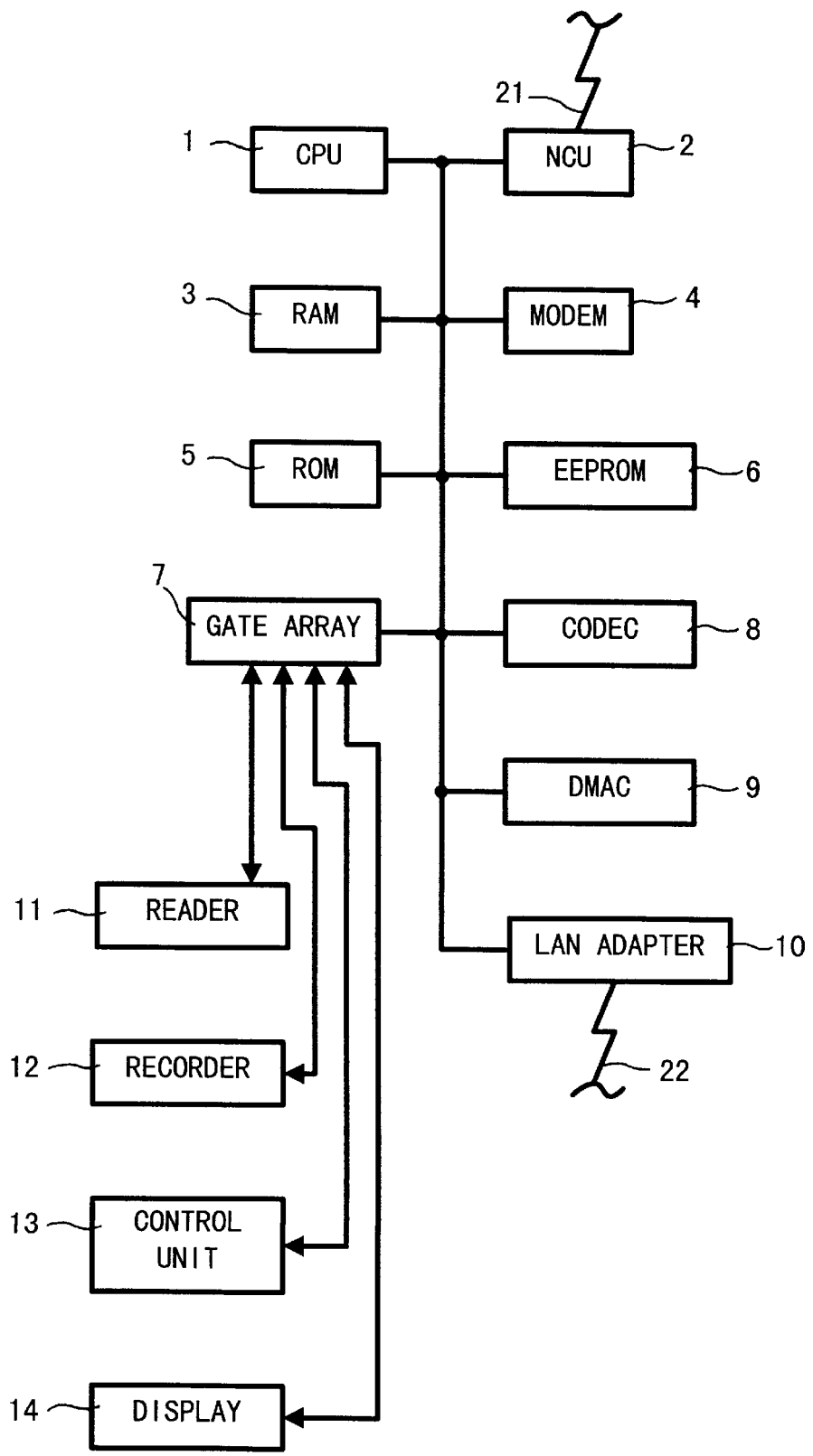
FIG. 1 is a fragmentary circuit block diagram showing a facsimile apparatus as a preferred embodiment of a communication apparatus according to the invention.

A preferred embodiment of the invention will hereinafter be described specifically with reference to the accompanying drawings. FIG. 1 is a fragmentary circuit block diagram illustrating a facsimile apparatus as one example of a communication apparatus according to the invention. The facsimile apparatus comprises a CPU 1, an NCU 2, a RAM 3, a modem 4, a ROM 5, an EEPROM 6, a gate array 7, a codec 8, a DMAC 9, a LAN adapter 10, a reader 11, a recorder 12, a control unit 13, and a display 14. The CPU 1, NCU 2, RAM 3, modem 4, ROM 5, EEPROM 6, codec 8, DMAC 9 and LAN adapter 10 are electrically connected to one another by a bus line. The bus line includes an address bus, a data bus and a control signal line. The reader 11, the recorder 12, the control unit 13 and the display 14 are electrically connected to the gate array 7. The modem 4 and a telephone line 21 are electrically connected to the NCU 2. A LAN 22 is electrically connected to the LAN adapter 10.

The CPU 1 controls the entire facsimile apparatus. The NCU 2 is electrically connected to the telephone line 21 so as to perform network control. The RAM 3 stores various digital data therein. The modem 4 modulates transmit data and demodulates receive data, for example. The ROM 5 has already stored various programs, data, etc. therein. The EEPROM 6 has already stored various registration data such as so-called one-touch dialing, abbreviated dialing, etc., and flags, etc. therein. The gate array 7 functions as an input/output interface for the CPU 1. The codec 8 encodes transmit facsimile data and decodes receive facsimile data. The DMAC 9 controls memory access to the RAM 3 or the like. The LAN adapter 10 serves as an interface to the LAN 22. The reader 11 has a light source, a CCD sensor, an original feed motor, etc. and reads an original to output an image signal. The recorder 12 records an image on a sheet of recording paper based on image data. The control unit 13 is composed of a keyswitch group, etc. and outputs an operation signal corresponding to the operation of a user. The display 14 comprises an LCD and the like and performs various displays under the control of the CPU 1.

Namely, the CPU 1 is activated based on the programs stored in the ROM 5 so as to implement a transmission-destined information classification determining device for making a decision as to whether the type of information destined for transmission inputted to the control unit 13 corresponds to either one of the telephone line 21 and the LAN 22 and a transmit information output device for selectively outputting information to be transmitted, to either one of the telephone line 21 and the LAN 22 according to the decision by the transmission-destined information classification determining device. The CPU 1 also implements a transmission-destined information supplying device for reading information destined for transmission, corresponding to one-touch dialing or abbreviated dialing having one-digit or a few-digit figures or signs and supplying it to the transmission-destined information classification determining device when the one-touch dialing or abbreviated dialing is inputted thereto. In addition, the CPU 1 implements a data converting device for converting a data format of information to be transmitted into a data format fit to an actually-outputting communications network or communication line when the information to be transmitted is outputted to the LAN 22 because transmission to be made through the telephone line 21 is placed in an impracticable state and when information to be transmitted is outputted to the telephone line 21 because transmission to be made through the LAN 22 is placed in an impracticable state.

The ROM 5 has already stored therein programs including a transmission-destined information classification determining program for making a decision as to whether the type of information destined for transmission, which is inputted to the control unit 13, corresponds to either one of the telephone line 21 and the LAN 22, and a transmit information output program for selectively outputting information to be transmitted, to either one of the telephone line 21 and the LAN 22 according to the result of decision by the transmission-destined information classification determining program. The EEPROM 6 constitutes a memory device for storing therein transmission-destined information in association with one-digit or a few-digit signs.

The essential point of the operation of the facsimile apparatus constructed as described above will be described next. When a so-called one-touch dial number or abbreviated dial number is inputted by the operation of the control panel 13 by a user upon transmission, the transmission-destined information corresponding to the number is read from the EEPROM 6 and whether or not the information destined for transmission is a telephone number or a mail address, is checked. If the information is found to be the telephone number, it is then composed of figures alone. On the other hand, if the information is the mail address, it is then composed of alphabetical characters and predetermined alphabetic codes or symbols. This checking can be easily done. When information destined for transmission is directly inputted by the operation of the control unit 13 by the user, it is of course checked whether the information is a telephone number or a mail address.

If the transmission-destined information is found to be the telephone number, then a dial pulse corresponding to the telephone number is delivered to the telephone line 21. If the facsimile apparatus is successfully connected to a transmit destination, then transmit image data read by the reader 11 and coded by the codec 8 is modulated by the modem 4, followed by supply to the telephone line 21. If the connection to the transmit destination fails because the line is busy or faulty, a check is made as to whether a mail address corresponding to a telephone number for the transmit destination has been registered into the EEPROM 6. If it is found to have been registered therein, then the mail address is sent to the LAN 22. If the connection to the transmit destination is successful, then the transmit image data read by the reader 11 is converted into character data, which in turn is sent to the LAN 22. If the connection to the transmit destination fails to succeed due to the failure in the state of the line, then both the telephone line 21 and the LAN 22 are unable to transmit the data therethrough. Therefore, no data is transmitted.

If the information destined for transmission is found to be the mail address, then the mail address is sent to the LAN 22. If the connection to the transmit destination is successful, then transmit character data is sent to the LAN 22. The character data may be data produced from a personal computer when the facsimile apparatus is connected to the personal computer. Alternatively, image data read by the reader 11 may be converted into character data. If the connection to the transmit destination fails to succeed due to a failure in the state of the line or the like, then a check is made as to whether a telephone number corresponding to the mail address for the transmit destination has been registered into the EEPROM 6. If the telephone number is found to have been registered therein, then the telephone number is sent to the telephone line 21. If the connection to the transmit destination results in success, then the transmit character data is converted into image data, which in turn is delivered to the telephone line 21. If the connection to the transmit destination fails to succeed due to the failure in the state of the line, or the like, then both the telephone line 21 and the LAN 22 fall into an intransmittable state and hence no data transmission is made.

A procedure for performing connection processing by such a facsimile apparatus will be described with reference to a flowchart shown in FIG. 2.

When a user inputs a transmit destination via keys on the control unit 13, the CPU 1 makes a decision as to whether the input transmit destination corresponds to simplified information destined for transmission (S1). Namely, since the user directly inputs the information destined for transmission or inputs a so-called one-touch dial number or abbreviated dial number, the CPU 1 checks whether the input transmit destination corresponds to the one-touch dial number or abbreviated dial number.

If it is determined that the input transmit destination is the simplified transmission-destined information (if the answer is found to be YES in S1), then the CPU 1 determines whether the transmission-destined information associated with the input number exists in the EEPROM 6 (S2). Namely, the CPU 1 checks whether the transmission-destined information corresponding to the input number has been registered into the EEPROM 6. If it is determined that the transmission-destined information corresponding to the input number exists in the EEPROM 6 (if the answer is found to be YES in S2), then the CPU 1 reads the transmission-destined information corresponding to the input number from the EEPROM 6 (S3) and makes a decision as to whether the information destined for transmission comprises figures alone (S4). Namely, if the transmission-destined information is of the telephone number, then it consists of figures alone. If the transmission-destined information is of the mail address, it is composed of alphabetical characters and specific alphabetic signs alone. Therefore, in order to make a decision as to whether transmit data should be delivered to the telephone number 21 or the LAN 22, the CPU 1 checks whether the transmission-destined information corresponds to either the telephone number or the mail address.

If it is determined that the transmission-destined information comprises the figures alone (if the answer is found to be YES in S4), then the CPU 1 controls the NCU 2 to electrically connect the telephone line 21 to the NCU 2 based on the information destined for transmission (S5). Namely, the CPU 1 sends a dial pulse corresponding to the telephone number indicative of the transmission-destined information to the telephone line 21. Next, the CPU 1 makes a decision as to whether the connection to the telephone line 21 has succeeded (S6). If it is determined in S6 that the connection to the telephone line 21 has succeeded (if the answer is found to be YES in S6), then the CPU 1 supplies transmit image data to the modem 4 so that the transmit image data is delivered to the telephone line 21 (S7). The CPU 1 determines whether the delivery of the transmit image data to the telephone line 21 has been completed (S8). If it is determined in S8 that the delivery of the transmit image data to the telephone line 21 has been terminated (if the answer is found to be YES in S8), then the CPU 1 controls the NCU 2 to open the telephone line 21 (S9), and hence this routine is terminated.

If it is determined in S8 that the delivery of the transmit image data to the telephone line 21 has not yet been finished (if the answer is found to be NO in S8), then the CPU 1 is returned to S8 where the delivery of the transmit image data to the telephone line 21 is continuously performed.

If it is determined in S6 that the connection to the telephone line 21 has ended in failure (if the answer is found to be NO in S6), then the CPU 1 makes a decision as to whether transmission-destined information for the LAN 22 corresponding to the transmission-destined information for the telephone line 21 is stored in the EEPROM 6 (S10). Namely, if the connection to the telephone line 21 is placed in an impracticable state because the line is busy or faulty, then the CPU 1 checks, to find the possibility of transmission of the information to the same transmit destination through the LAN 22, that is, whether the transmission-destined information for the LAN 22 to the same transmit destination has been stored in the EEPROM 6. Now, the EEPROM 6 has already stored therein a table indicative of the correspondence of the transmission-destined information for the telephone line 21 with respect to the same transmit destination and the transmission-destined information for the LAN 22 with respect to the same transmit destination. If it is determined from retrieval of the table that the transmission-destined information for the LAN 22 corresponding to the transmission-destined information for the telephone line 21 has been stored in the EEPROM 6 (if the answer is found to be YES in S10), then the CPU 1 reads the transmission-destined information for the LAN 22 from the EEPROM 6 (S11). Further, the CPU 1 controls the LAN adapter 10 to connect the LAN 22 thereto based on the information destined for transmission (S12). Namely, a mail address corresponding to the transmission-destined information is sent to the LAN 22. The CPU 1 makes a decision as to whether the connection to the LAN 22 has succeeded (S13). If it is determined in S13 that the connection to the LAN 22 has succeeded (if the answer is found to be YES in S13), then the CPU 1 converts transmit image data into text data (S14) and proceeds to S17. Namely, the CPU 1 converts image data read by the reader 11 into text data represented in data format, which is used for communications through the LAN 22. Further, the converted text data is sent to the LAN 22 as transmit character data. The conversion of the image data to the text data is executed by activating the CPU 1 based on the OCR programs stored in the ROM 5.

If it is determined in S13 that the connection to the LAN 22 has ended in failure (if the answer is found to be NO in S13), the transmission of the information through the telephone line 21 and the transmission of the information through the LAN 22 are found to be impracticable. Therefore, this routine is terminated.

If it is determined in S10 that the transmission-destined information for the LAN 22 corresponding to the transmission-destined information for the telephone line 21 has not been stored in the EEPROM 6 (if the answer is found to be NO in S10), then the transmission-destined information cannot be transmitted, and hence this routine is finished.

Since the transmission-destined information is of the mail address if it is determined in S4 that the transmission-destined information does not comprise the figures alone (if the answer is found to be NO in S4), the CPU 1 controls the LAN adapter 10 to connect the LAN 22 thereto based on the transmission-destined information (S15). Namely, the mail address corresponding to the transmission-destined information is sent to the LAN 22. The CPU 1 makes a decision as to whether the connection to the LAN 22 has succeeded (S16). If it is determined in S16 that the connection to the LAN 22 has succeeded (if the answer is found to be YES in S16), then the CPU 1 causes the LAN adapter 10 to send transmit character data through the LAN 22 (S17) and proceeds to S8. The transmit character data may be one obtained by allowing the CPU 1 to data-convert the image data read by the reader 11. Alternatively, data produced from an unillustrated microcomputer may be used when the facsimile apparatus is electrically connected to the microcomputer.

If it is determined in S16 that the connection to the LAN 22 has ended in failure (if the answer is found to be NO in S16), then the CPU 1 makes a decision as to whether transmission-destined information for the telephone line 21 corresponding to transmission-destined information for the LAN 22 has been stored in the EEPROM 6 (S18). Namely, if the connection to the LAN 22 is placed in an impracticable state due to a failure in the state of the line or the like, then the CPU 1 checks, to find the possibility of transmission of the transmission-destined information to the same transmit destination through the telephone line 21, that is, whether the transmission-destined information for the telephone line 21 to the same transmit destination has been stored in the EEPROM 6. Described specifically, the present check is performed by retrieving the correspondence table stored in the EEPROM 6. If it is determined that the transmission-destined information for the telephone line 21 corresponding to the transmission-destined information for the LAN 22 has been stored in the EEPROM 6 (if the answer is found to be YES in S18), then the CPU 1 reads the transmission-destined information for the telephone line 21 from the EEPROM 6 (S19). Further, the CPU 1 controls the NCU 2 to connect the telephone line 21 thereto based on the information destined for transmission (S20). Namely, a dial pulse for a telephone number corresponding to the transmission-destined information is sent to the telephone line 21. The CPU 1 makes a decision as to whether the connection to the telephone line 21 has succeeded (S21). If it is determined in S21 that the connection to the telephone line 21 has succeeded (if the answer is found to be YES in S21), then the CPU 1 converts text data into transmit image data (S22) and proceeds to S7. The conversion of the text data to the image data is executed by the CPU 1 using a table for converting the text data stored in the ROM 5 into transmit image data.

If it is determined in S21 that the connection to the telephone line 21 has ended in failure (if the answer is found to be NO in S21), both the transmission of the information through the telephone line 21 and the transmission of the information through the LAN 22 are found to be impracticable. Therefore, this routine is terminated.

If it is determined in S18 that the transmission-destined information for the telephone line 21 corresponding to the transmission-destined information for the LAN 22 has not been stored in the EEPROM 6 (if the answer is found to be NO in S18), then the transmission-destined information cannot be transmitted, and hence this routine is finished.

If it is determined in S2 that the transmission-destined information corresponding to the input number does not exist in the EEPROM 6 (if the answer is found to be NO in S2), then the information destined for transmission is unknown and intransmittable and hence this routine is terminated.

If the input transmit destination is determined not to be the simplified information destined for transmission in S1 (if the answer is found to be NO in S1), then the CPU 1 does not need to read the transmission-destined information from the EEPROM 6. Therefore, the CPU 1 proceeds to S4.

When transmit data identical in contents to each other are sent to a plurality of transmit destinations, simplified transmission-destined information or transmission-destined information inputted by a user are stored in the RAM 3 or EEPROM 6. In this condition, the simplified information destined for transmission or transmission-destined information are successively read from the RAM 3 or EEPROM 6 and may be transmitted in accordance with the above-described procedure.

What is claimed is:

1. A communication apparatus connected to a plurality of communications networks different from one another, comprising:

an input device that inputs transmission-destined information therein;

a transmission-destined information classification determining device that determines whether the type of transmission-destined information inputted to said input device corresponds to any of said plurality of communication networks, said transmission-destined information classification determining device evaluating whether the transmission-destined information contains either a first type of input information or a second type of input information; and a transmit information output device that selectively outputs transmission-destined information to: 1) one of said plurality of communications networks if said transmission-destined information classification determining device determines that the transmission-destined information contains said first type of input information; or 2) another of said plurality of communications networks if said transmission-destined information classification determining device determines that the transmission-destined information contains said second type of input information.

2. The communication apparatus of claim 1, further comprising:

a memory device that stores the transmission-destined information therein so as to correspond to a one-digit sign or a few-digit signs; and a transmission-destined information supplying device that reads the transmission-destined information from said memory device and supplies the transmission-destined information to said transmission-destined information classification determining device.

3. The communication apparatus of claim 1, wherein said communications networks comprise two types of a first and second communications networks, the communication apparatus further comprising:

a memory device that stores the transmission-destined information, wherein when the transmission-destined information to be transmitted to the same transmit destination is different in type, said memory device stores the transmission-destined information to correspond by type, and when one type of the transmission-destined information stored in said memory device is inputted from said input device, said transmit information output device selects one of said first and second communications networks and outputs the transmission-destined information to said selected one of said first and second communications networks according to the determination by said transmission-destined information classification determining device, and when the transmission-destined information is intransmittable through said selected communications network, said transmit information output device reads another type of said transmission-destined information from said memory device and outputs the information to be transmitted to a non-selected one of said first and second communications networks.

4. The communication apparatus of claim 3, further comprising:

a data converting device that converts a data format of the transmission-destined information into a data format fit to an actually-outputting communications network when the transmission-destined information is outputted to said second communications network upon a transmission made through said first communications network being placed in an impracticable state and to said first communications network upon a transmission made through said second communications network being placed in the impracticable state.

5. The communication apparatus of claim 1, wherein one of said plurality of communications networks includes a telephone line and another of said plurality of communication networks includes a LAN, and which further comprises:

a modem that transmits data to said telephone line; and a LAN adapter that transmits data to said LAN.

6. The communication apparatus of claim 5, wherein said modem includes an NCU.

7. The communication apparatus of claim 3, wherein said memory device comprises a non-volatile memory which stores a table showing the correspondence of the first and second communications networks corresponding to the same transmit destination.

8. A method of connecting a communication apparatus to a plurality of communications networks different from one another, comprising:

inputting transmission-destined information therein using an input device, said transmission-destined information corresponding to one of first and second types of input information;

determining whether the type of transmission-destined information inputted to said input device corresponds to any of said plurality of communication networks and evaluating whether the transmission-destined information contains either of the first or second input types of information; and selectively outputting transmission-destined information to: 1) one of said plurality of communications networks if it is determined that the transmission-destined information contains said first type of input information; or 2) another of said plurality of communications networks if it is determined that the transmission-destined information contains said second type of input information.

9. The method of claim 8, further comprising:

storing the transmission-destined information in a memory device so as to correspond to a one-digit sign or a few-digit signs;

reading the transmission-destined information from said memory device; and supplying the transmission-destined information for the determination.

10. The method of claim 8, wherein said communications networks comprise two types of a first and second communications networks, the method further comprising:

storing the transmission-destined information in a memory device, the transmission-destined information corresponding by type when the transmission-destined information to be transmitted to the same transmit destination is different in type;

selecting one of said first and second communications networks and outputting the transmission-destined information to said selected one of said first and second communications networks according to the determination when one type of the transmission-destined information stored in said memory device is inputted from said input device; and reading another type of said transmission-destined information from said memory device and outputting the information to be transmitted to a non-selected one of said first and second communications network when the transmission-destined information is intransmittable through said selected communications network.

11. The method of claim 10, further comprising:

converting a data format of the transmission-destined information into a data format fit to an actually-outputting communications network when the transmission-destined information is outputted to said second communications network upon a transmission made through said first communications network being placed in an impracticable state and to said first communications network upon a transmission made through said second communications network being placed in the impracticable state.

12. The method of claim 8, wherein one of said plurality of communications networks includes a telephone line and another of said plurality of communication networks includes a LAN, further comprising:

transmitting data to said telephone line with a modem; and transmitting data to said LAN with a LAN adapter.

13. The method of claim 12, wherein said modem includes an NCU.

14. The method of claim 10, further comprising storing a table showing the correspondence of the first and second communications networks corresponding to the same transmit destination, said memory device including a non-volatile memory.

15. A communication apparatus connected to a plurality of communications networks different from one another, comprising:

input means for inputting transmission-destined information therein;

transmission-destined information classification determining means for determining whether the type of transmission-destined information inputted to said input means corresponds to any of said plurality of communication networks, said transmission-destined information classification determining means evaluating whether the transmission-destined information contains either a first type of input information or a second type of input information; and transmit information output means for selectively outputting transmission-destined information to 1) one of said plurality of communications networks if said transmission-destined information classification determining means determines that the transmission-destined information contains said first type of input information; or 2) another of said plurality of communications networks if said transmission-destined information classification determining means determines that the transmission-destined information contains said second type of input information.

16. The communication apparatus of claim 15, further comprising:

memory means for storing the transmission-destined information therein so as to correspond to a one-digit sign or a few-digit signs; and transmission-destined information supplying means for reading the transmission-destined information from said memory means and supplying the transmission-destined information to said transmission-destined information classification determining means.

17. The communication apparatus of claim 15, wherein said communications networks comprise two types of a first and second communications networks, the communication apparatus further comprising:

a memory means for storing the transmission-destined information, wherein when the transmission-destined information to be transmitted to the same transmit destination is different in type, said memory means stores the transmission-destined information to correspond by type, and when one type of the transmission-destined information stored in said memory means is inputted from said input means, said transmit information output means selects one of said first and second communications networks and outputs the transmission-destined information to said selected one of said first and second communications networks according to the determination by said transmission-destined information classification determining means, and when the transmission-destined information is intransmittable through said selected communications network, said transmit information output means reads another type of said transmission-destined information from said memory means and outputs the information to be transmitted to a non-selected one of said first and second communications networks.

18. The communication apparatus of claim 17, further comprising:

a data converting means for converting a data format of the transmission-destined information into a data format fit to an actually-outputting communications network when the transmission-destined information is outputted to said second communications network upon a transmission made through said first communications network being placed in an impracticable state and to said first communications network upon a transmission made through said second communications network being placed in the impracticable state.

19. The communication apparatus of claim 15, wherein one of said plurality of communications networks includes a telephone line and another of said plurality of communication networks includes a LAN, and which further comprises:

first means for transmitting data to said telephone line; and second means for transmitting data to said LAN.

20. A storage medium for activating a communication apparatus connected to a plurality of communications networks different from one another, comprising:

a transmission-destined information classification determining program that decides whether the type of input transmission-destined information corresponds to a first type of input information for use with a first one of said plurality of communications networks or a second type of input information for use with a second one of said plurality of communications networks; and a transmit information output program that selectively outputs the transmission-destined information to: 1) said first one of said plurality of communications networks if said transmission-destined information classification determining program decides that the transmission-destined information is of the first type of input information; or 2) said second one of said plurality of communications networks if said transmission-destined information classification determining program decides that the transmission-destined information is of the second type of input information.

* * * * *